· US011933433B2

(12) United States Patent
Price et al.

(10) Patent No.: US 11,933,433 B2
(45) Date of Patent: Mar. 19, 2024

(54) RADIO-FREQUENCY IDENTIFICATION FLUID CONNECTION

(71) Applicant: Oetiker NY, Inc., Lancaster, NY (US)

(72) Inventors: Martin R. Price, Buffalo, NY (US); Kristian James Hagen, Gasport, NY (US); Kari Ann Sausen, Clarence, NY (US); James E. Caroll, Aurora, OH (US)

(73) Assignee: Oetiker NY, Inc., Lancaster, NY (US)

( * ) Notice: Subject to any disclaimer, the term of this patent is extended or adjusted under 35 U.S.C. 154(b) by 269 days.

(21) Appl. No.: 17/635,249

(22) PCT Filed: Jun. 15, 2020

(86) PCT No.: PCT/US2020/037736
§ 371 (c)(1),
(2) Date: Feb. 14, 2022

(87) PCT Pub. No.: WO2021/066895
PCT Pub. Date: Apr. 8, 2021

(65) Prior Publication Data
US 2022/0221091 A1    Jul. 14, 2022

Related U.S. Application Data

(60) Provisional application No. 62/907,758, filed on Sep. 30, 2019.

(51) Int. Cl.
*F16L 37/088* (2006.01)
*F16L 23/00* (2006.01)
*F16L 23/036* (2006.01)
*F16L 23/10* (2006.01)
*G06K 19/077* (2006.01)

(52) U.S. Cl.
CPC ............ *F16L 23/006* (2013.01); *F16L 23/036* (2013.01); *F16L 23/10* (2013.01); *G06K 19/07758* (2013.01); *G06K 19/07798* (2013.01); *F16L 2201/10* (2013.01); *F16L 2201/60* (2013.01)

(58) Field of Classification Search
CPC . F16L 37/088; F16L 37/0885; F16L 2201/10; F16L 2201/60
See application file for complete search history.

(56) References Cited

U.S. PATENT DOCUMENTS

| 7,854,623 | B2 | 12/2010 | Radenne et al. |
| 8,746,041 | B2 | 6/2014 | Howard et al. |
| 8,857,723 | B2 | 10/2014 | Kotyrba |
| 9,080,922 | B2 | 7/2015 | Howard et al. |

(Continued)

FOREIGN PATENT DOCUMENTS

| CN | 204360938 | 5/2015 |
| CN | 204927088 | 12/2015 |

(Continued)

*Primary Examiner* — Aaron M Dunwoody
(74) *Attorney, Agent, or Firm* — Harter Secrest & Emery LLP; Michael Nicholas Vranjes

(57) ABSTRACT

A radio-frequency identification (RFID) fluid connection, including a tube or hose, the tube or hose including a radially outward facing surface, a RFID assembly or label connected the radially outward facing surface, including a RFID tag, and at least one contact electrically connected to the RFID tag.

18 Claims, 14 Drawing Sheets

(56) References Cited

U.S. PATENT DOCUMENTS

| | | | |
|---|---|---|---|
| 2005/0063125 A1* | 3/2005 | Kato | F16L 37/144 |
| | | | 361/113 |
| 2016/0369922 A1 | 12/2016 | Blake et al. | |
| 2018/0009174 A1 | 1/2018 | Mencos | |
| 2018/0165561 A1* | 6/2018 | Gabriel | G06K 19/0707 |
| 2018/0266602 A1 | 9/2018 | Fremont | |
| 2019/0049049 A1 | 2/2019 | Ignaczak et al. | |
| 2019/0257456 A1 | 8/2019 | Ignaczak et al. | |

FOREIGN PATENT DOCUMENTS

| | | |
|---|---|---|
| CN | 105910529 | 8/2016 |
| DE | 202004002116 U1 | 6/2004 |
| EP | 1772659 A2 | 4/2007 |
| EP | 3249634 A1 | 11/2017 |
| EP | 3544114 A1 | 9/2019 |
| JP | S62292495 | 12/1987 |
| JP | 200569461 | 3/2005 |
| JP | 2015093004 | 5/2015 |
| JP | 2017135443 | 8/2017 |
| WO | 2019033019 | 2/2019 |

\* cited by examiner

RADIO-FREQUENCY IDENTIFICATION FLUID CONNECTION

CROSS-REFERENCE TO RELATED APPLICATIONS

The present application is the U.S. National Stage Application pursuant to 35 U.S.C. § 371 of International Patent Application No. PCT/US2020/037736, filed on Jun. 15, 2020, which application claims the benefit of U.S. Provisional Patent Application No. 62/907,758, filed on Sep. 30, 2019, which applications are hereby incorporated by reference in their entireties.

FIELD

The present disclosure relates to a connection verifier for a fluid connection, and, more particularly, to a fluid connection comprising a radio-frequency identification (RFID) tag that indicates the status of a connection via wireless transmission.

BACKGROUND

As is known in the art, a "fluid" is a substance that continually deforms (flows) under an applied shear stress, or external force. Fluids are a phase of matter and include liquids, gases, and plasmas.

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors and/or a clamp/clamping element. Such fluid connectors typically include a retaining ring, retaining clip, snap ring, clamp, or other clamping element carried on the fluid connector which is adapted to snap behind a raised shoulder of a tube end form when the tube end form is fully inserted into the fluid connector. If the tube end form or hose is not fully inserted into the fluid connector or clamped to the connector, the fluid connection may fail causing fluids to leak out and other more serious consequences. It should be appreciated that fluid connectors extend not only to liquid connections but also to gas and plasma connections. For example, fluid connectors used for the transfer of propane, butane, natural gas, etc. are widely used commercially and non-commercially. Failure of a gas connection, as with liquid connectors, may have serious consequences.

RFID uses electromagnetic fields to automatically identify and track tags attached to objects. The tags contain electronically stored information. Passive RFID tags collect energy from a nearby RFID reader's interrogating radio waves. Active RFID tags have a local power source (such as a battery) and may operate hundreds of meters from the RFID reader. Unlike a barcode, RFID tags don't need to be within the line of sight of the reader, so they may be embedded in the tracked object. RFID is one method of automatic identification and data capture (AIDC). RFID tags are used in many industries. For example, a RFID tag attached to an automobile during production can be used to track its progress through the assembly line, RFID-tagged pharmaceuticals can be tracked through warehouses, and implanting RFID microchips in livestock and pets enables positive identification of animals.

Thus, there has been a long-felt need for a connection verifier that utilizes RFID to ensure that a fluid connection is securely connected.

SUMMARY

According to aspects illustrated herein, there is provided a radio-frequency identification (RFID) fluid connection, comprising a tube, including a radially outward facing surface, a RFID assembly connected the radially outward facing surface, including a RFID tag, and at least one contact electrically connected to the RFID tag.

In some embodiments, the tube further comprises a shoulder connected to the radially outward facing surface and the RFID assembly is arranged proximate the shoulder. In some embodiments, the RFID assembly is arranged on a first layer and the first layer is connected to the radially outward facing surface. In some embodiments the at least one contact comprises a first contact electrically connected to the RFID tag and a second contact electrically connected to the RFID tag, the second contact being separated from the first contact to form an open state of the RFID assembly. In some embodiments, in a closed state, the first contact is electrically connected to the second contact. In some embodiments, the first contact is operatively arranged to be electrically connected to the second contact via a retaining ring when the tube is connected to a fluid connector. In some embodiments, the at least one contact comprises a pressure sensitive contact electrically connected to the RFID tag via a first conductor and a second conductor. In some embodiments, the pressure sensitive contact comprises a first conductive layer electrically connected to the first conductor, a second conductive layer electrically connected to the second conductor, and an insulating layer separating the first and second conductive layers to form an open state of the RFID assembly. In some embodiments, in a closed state, the first conductive layer is electrically connected to the second conductive layer via a force applied to the first conductive layer. In some embodiments, the force is applied to the first conductive layer via a retaining ring of a fluid connector when the tube is connected to the fluid connector. In some embodiments, the RFID tag comprises an antenna, in an open state of the RFID tag, the antenna circuit is open, and in a closed state of the RFID tag, the antenna circuit is closed.

According to aspects illustrated herein, there is provided a radio-frequency identification (RFID) fluid connection, comprising a fluid connector, a retaining ring operatively arranged to engage the fluid connector, a tube operatively arranged to be connected to the fluid connector, the tube including a first radially outward facing surface, and a RFID assembly arranged on the first radially outward facing surface, including a RFID tag, and at least one contact electrically connected to the RFID tag.

In some embodiments, the tube further comprises a shoulder (or designated hose location or hose engagement surface) connected to the first radially outward facing surface, the shoulder arranged to interact with the retaining ring to lock the tube within the fluid connector and the at least one contact is operatively arranged proximate the shoulder to engage with the retaining ring. In some embodiments, the at least one contact comprises a first contact electrically connected to the RFID tag and a second contact electrically connected to the RFID tag, the second contact being separated from the first contact to form an open state of the RFID assembly. In some embodiments, when the tube is properly secured to the fluid connector, the retaining ring engages the first contact and the second contact, and the first contact is electrically connected to the second contact to form a closed state of the RFID assembly. In some embodiments, the retaining ring is a clamp. In some embodiments, the fluid connector comprises a second radially outward facing surface, and the tube and the retaining ring are operatively arranged to engage the second radially outward facing surface. In some embodiments, the RFID assembly is arranged on a layer and the layer is connected to the first radially outward facing surface. In some embodiments, the RFID tag comprises an antenna, in an open state of the RFID tag, the antenna circuit is open, and in a closed state of the RFID tag, the antenna circuit is closed.

According to aspects illustrated herein, there is provided a radio-frequency identification (RFID) fluid connection, comprising a fluid connector, a retaining ring operatively arranged to engage the fluid connector, a tube operatively arranged to be connected to the fluid connector, the tube including a radially outward facing surface, and a RFID assembly arranged on the radially outward facing surface and including a RFID tag including an antenna and an integrated circuit, and at least one contact electrically connected to the integrated circuit, wherein when the integrated circuit is open, the RFID tag indicates an improper connection of the RFID fluid connection, and when the integrated circuit is closed, the RFID tag indicates a proper connection of the RFID fluid connection.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
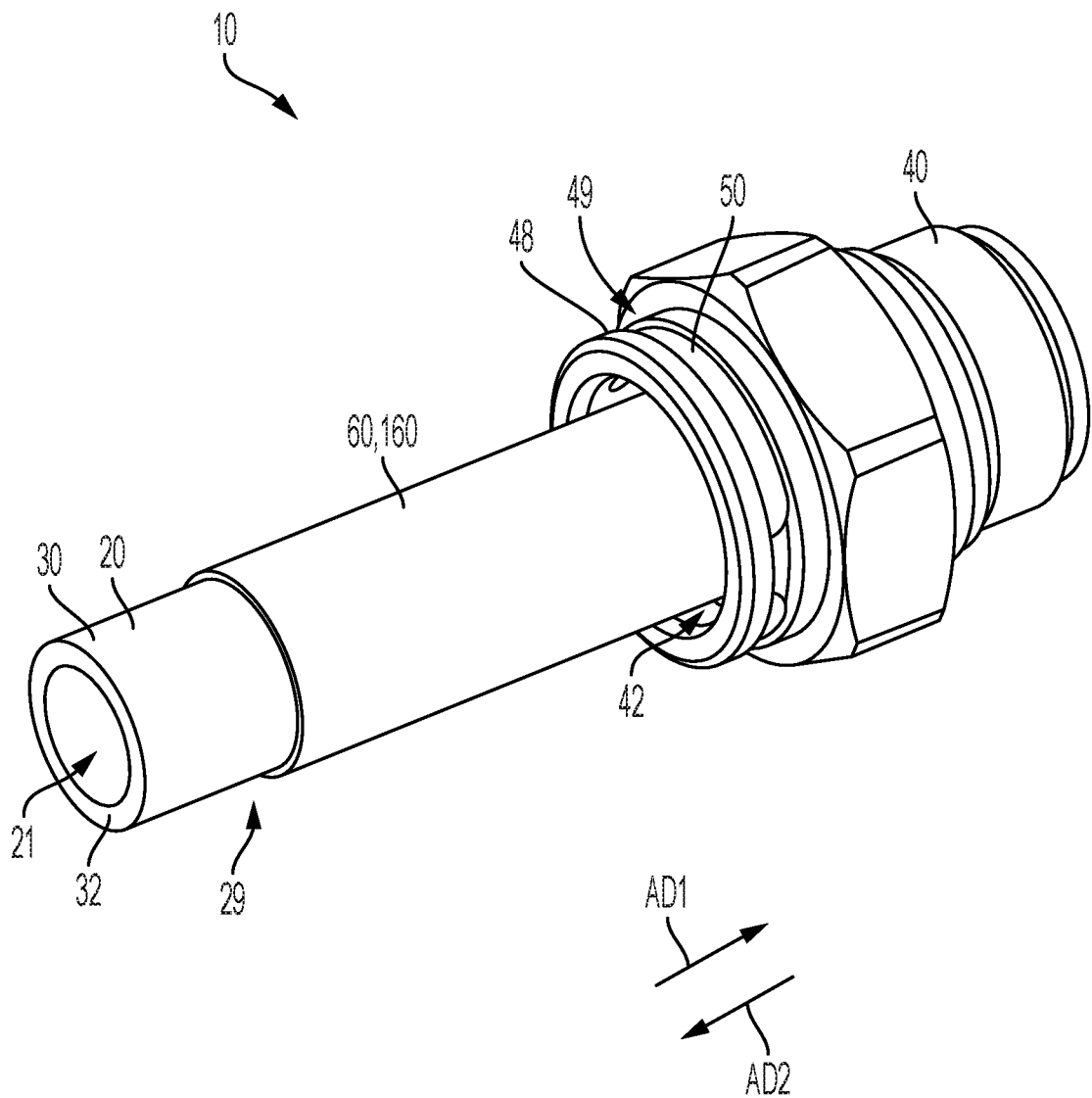
FIG. 1 is a perspective view of a RFID fluid connection.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required.

It should be appreciated that the term "tube" as used herein is synonymous with hose, pipe, channel, conduit, or any other suitable pipe flow used in hydraulics and fluid mechanics. It should further be appreciated that the term "tube" can mean a rigid or flexible conduit of any material suitable for containing and allowing the flow of a gas or a liquid.

Figure 2:
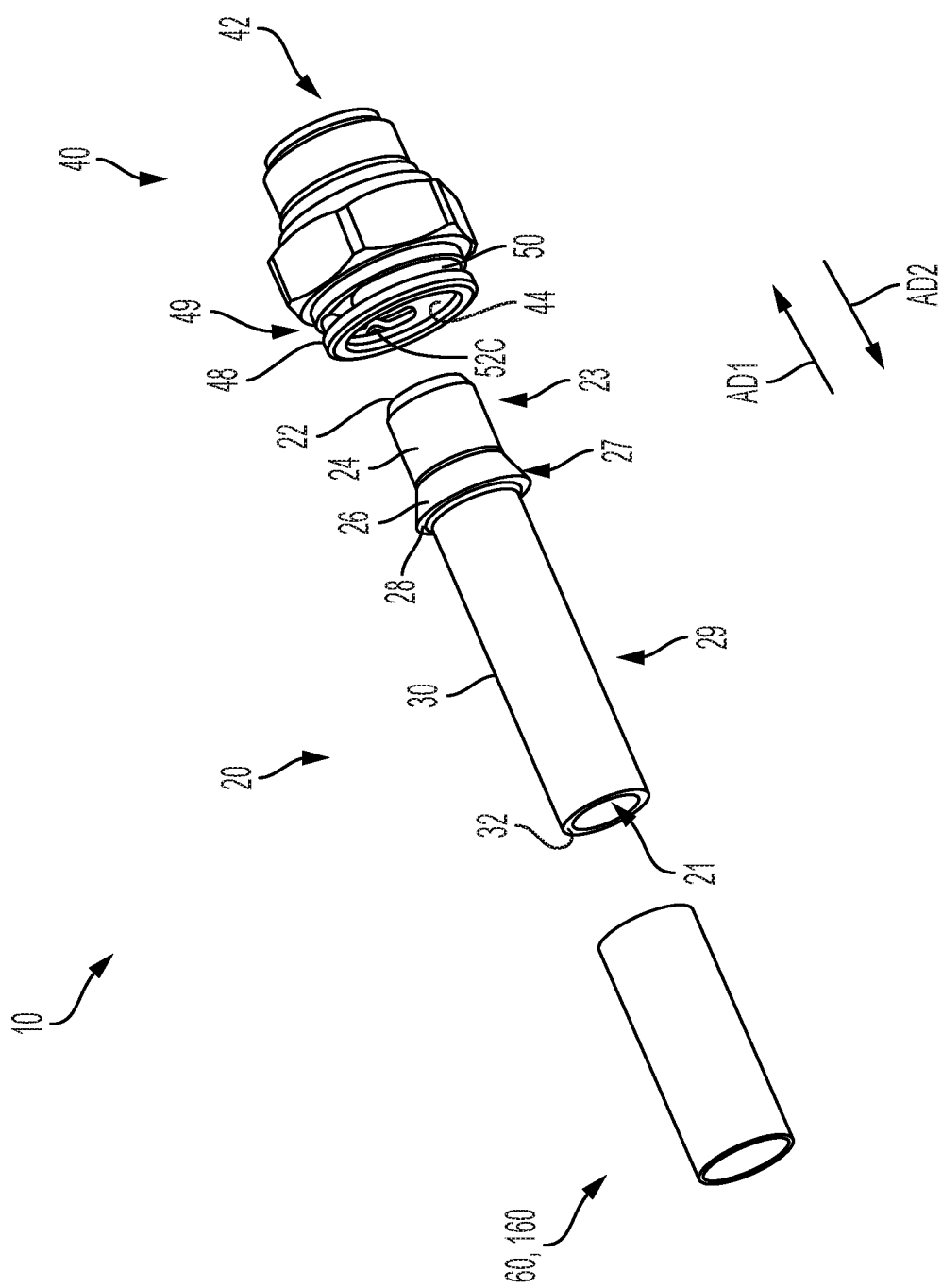
FIG. 2 is an exploded perspective view of the RFID fluid connection shown in FIG. 1.

Adverting now to the figures, FIG. 1 is a perspective view of RFID fluid connection 10. FIG. 2 is an exploded perspective view of RFID fluid connection 10. RFID fluid connection 10 generally comprises tube or tube end form or hose 20, fluid connector 40, retaining ring 50, and RFID assembly 60, 160. The following description should be read in view of FIGS. 1-2.

Tube end form 20 comprises end 22, section 23, shoulder 27, section 29, end 32, and through-bore 21. Through-bore 21 extends through tube end form 20 from end 22 to end 32. Section 23 is arranged between end 22 and shoulder 27 and comprises radially outward facing surface 24. Radially outward facing surface 24 includes a substantially constant diameter. Shoulder 27 is arranged between section 23 and section 29 and comprises radially outward facing surface 26. Radially outward facing surface 26 is a linear conical (or frusto-conical) shape and increases in diameter in axial direction AD2. Section 29 is arranged between shoulder 27 and end 32 and comprises radially outward facing surface 30. Radially outward facing surface 30 includes a substantially constant diameter. Shoulder 27 is connected to radially outward facing surface 30 via shoulder surface 28. Tube end form 20 is arranged to be inserted, specifically with end 22 first, into fluid connector 40. Tube end form 20 may utilize a straight ramp (i.e., constant linear ramp) or a curvilinear ramp, and is inserted into fluid connector 40, in axial direction AD1, until retaining ring 50 snaps over shoulder 27 and is generally aligned with section 29. It should be appreciated that tube end form 20 may be any traditional tube end form comprising a ramp, which extends radially outward and axially on the outer surface of the tube end form, to displace a retaining ring, snap ring, or wire clip within the fluid connector to secure the tube end form within the fluid connector. In some embodiments, tube end form 20 comprises any tube end form that might utilize a retaining ring, retaining clip, snap ring etc. For example, instead of a ramp-like shoulder, tube end form 20 may comprise a bead, a notch, a plurality of ramps, threading, a shoulder having a variable diameter portion (ramp) and a constant diameter portion connected thereto, any standard Society of Automotive Engineers (SAE) end form, etc. The present disclosure should not be limited to the use of only the tube end form shown in the figures, but rather any tube end form suitable for fluidly connecting to a fluid connector via a retaining ring. RFID assembly 60, 160 verifies that retaining ring 50 has "snapped" over shoulder 27 (and is arranged adjacent and/or proximate to shoulder surface 28) in order to determine that RFID fluid connection 10 is properly connected, as will be described in greater detail below.

Fluid connector 40 comprises through-bore 42, radially inward facing surface 44, and radially outward facing surface 48. Radially outward facing surface 48 comprises groove 49. Retaining ring 50 is arranged in groove 49. Retaining ring 50 comprises protrusions 52A, 52B, and 52C (see FIGS. 5 and 8). Protrusions 52A-C extend radially inward through apertures in groove 49 to engage shoulder 27, specifically, shoulder surface 28. It should be appreciated that retaining ring 50 may comprise any number of protrusions (e.g., one or more protrusions) suitable for properly connecting tube end form 20 and fluid connector 40 and contacting the one or more contacts of RFID assembly 60, 160 to indicate proper connection, as will be described in greater detail below. In some embodiments, retaining ring 50 has no protrusions. For example, retaining ring 50 may comprises a "C" clip which comprises a ring having a small section removed therefrom such that it is capable of radially expanding and snapping back to engage the one or more contacts.

Figure 3:
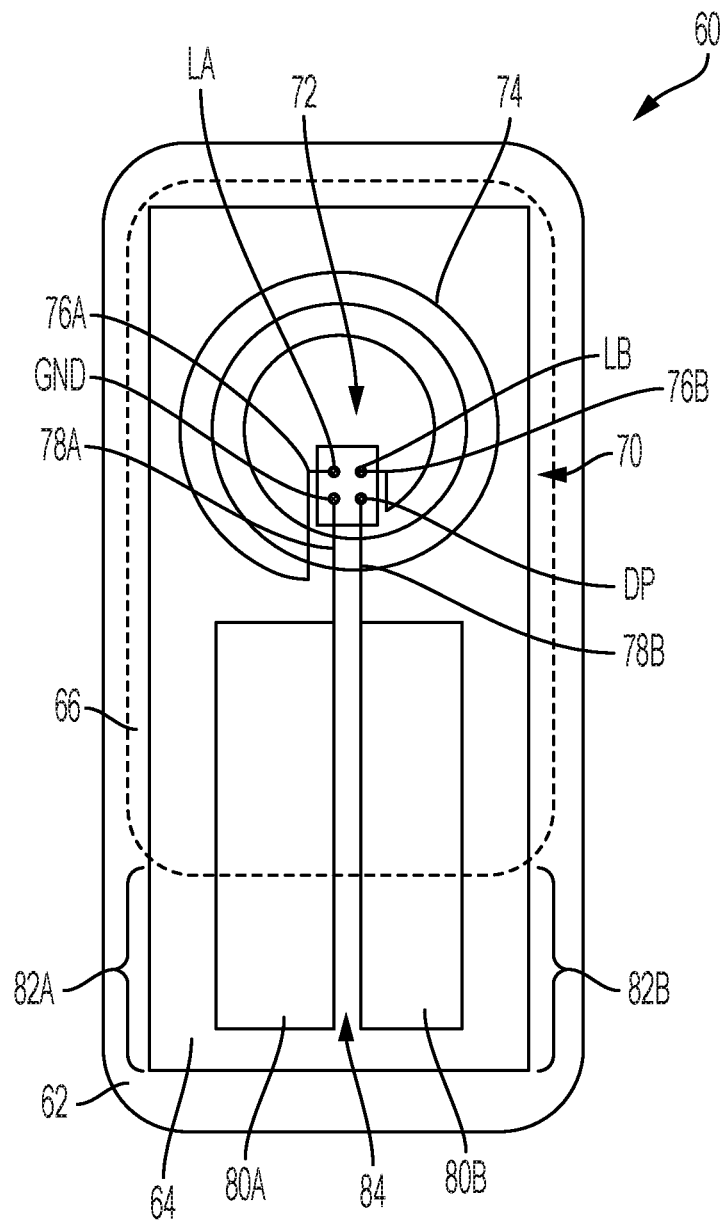
FIG. 3 is a top planar view of a RFID assembly, in accordance with some embodiments of the present disclosure.
Figure 4:
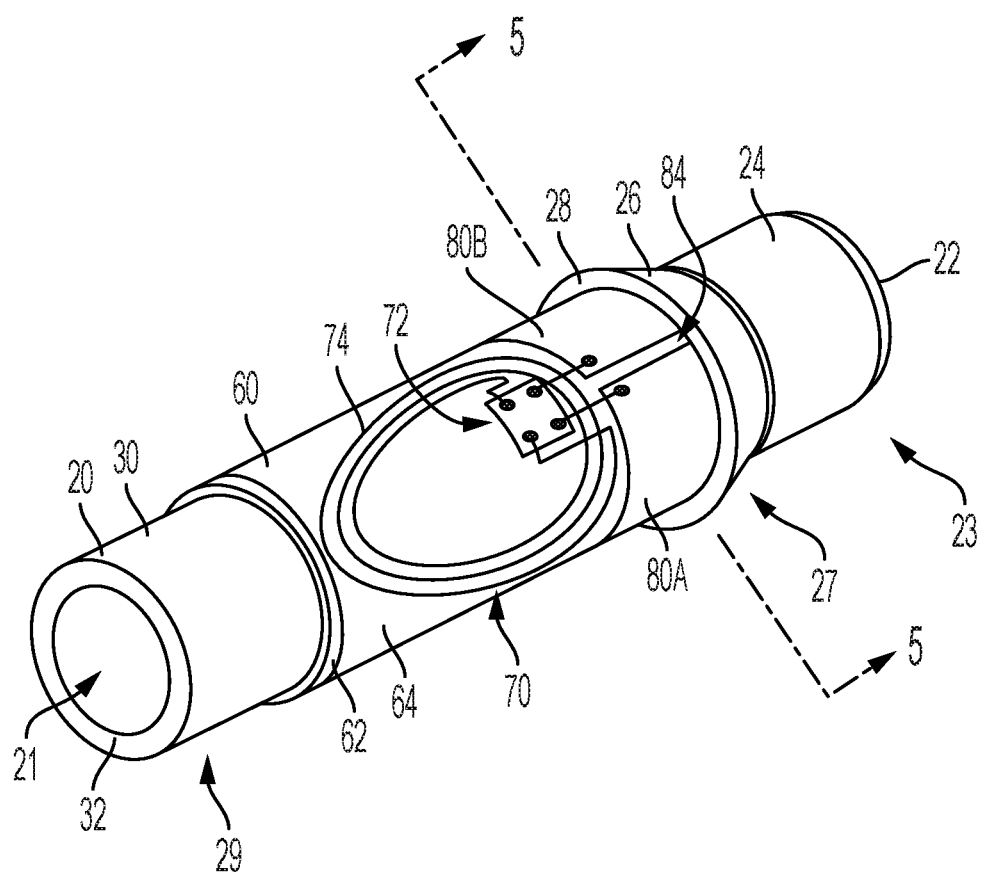
FIG. 4 is a perspective view of the RFID assembly shown in FIG. 3 arranged on a tube end form.
Figure 5:
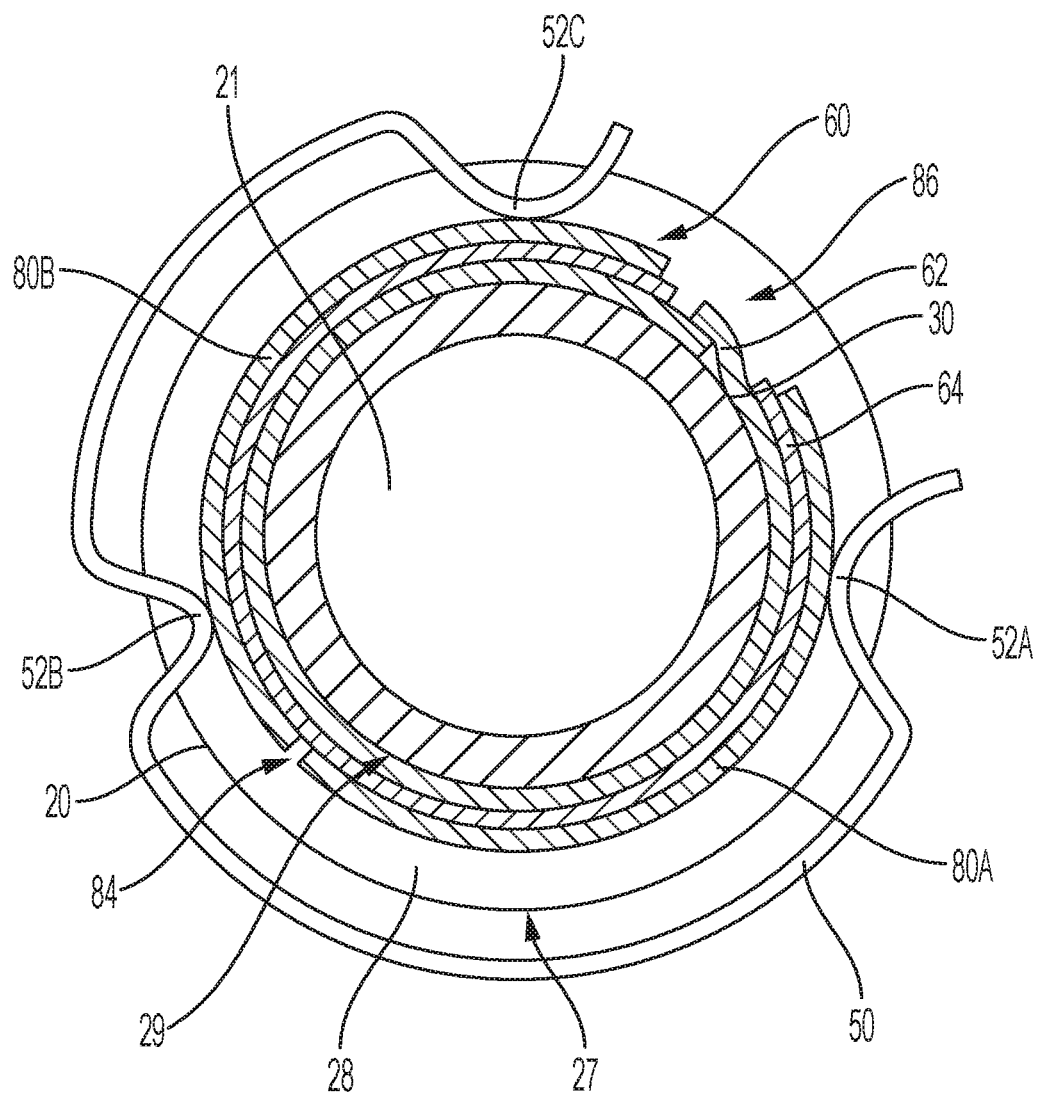
FIG. 5 is a cross-sectional view of the RFID assembly arranged on the tube end form taken generally along line 5-5 in FIG. 4.

FIG. 3 is a top planar view of RFID assembly 60, in accordance with some embodiments of the present disclosure. FIG. 4 is a perspective view of RFID assembly 60 arranged on tube end form 20. FIG. 5 is a cross-sectional view of RFID assembly 60 arranged on tube end form 20 taken generally along line 5-5 in FIG. 4. RFID assembly 60 generally comprises at least one layer (e.g., adhesive layer 62 and/or layer 64), RFID tag 70, and at least one contact (e.g., contact 80A and/or contact 80B). In some embodiments, RFID assembly 60 is a RFID label that is connected to a tube or component, wherein the tube or component is arranged to be connected to another component. It should be appreciated that RFID assembly 60 may be used to ensure any type of connection, not just a connection related to the flow of fluid, for example, a constant-velocity (CV) joint, a trailer hitch connection, electrical connections, etc. The following description should be read in view of FIGS. 1-5.

Adhesive layer 62 is operatively arranged to be secured to tube end form 20. In some embodiments, adhesive layer 62 secures layer 64 and/or contacts 80A and 80B to tube end form 20. It should be appreciated that layer 64 need not be connected to tube end form 20 via adhesives (i.e., adhesive layer 62), but rather can be connected and/or applied using any other suitable means, for example, string, tape, hook and loop fastener, solder, welding, etc. In some embodiments, adhesive layer 62 is wrapped around section 29 of tube end form 20 and is secured to radially outward facing surface 30 proximate to shoulder 27. In some embodiments, adhesive layer 62 completely circumscribes radially outward facing surface 30 and overlaps at its ends (see FIG. 5). In some embodiments, adhesive layer 62 completely circumscribes radially outward facing surface 30 and its ends abut against each other (see FIG. 8). In some embodiments, adhesive layer 62 does not completely circumscribe radially outward facing surface 30.

RFID assembly 60 may further comprise layer 64. Layer 64 is connected to the top surface of adhesive layer 62 and is operatively arranged as a platform or base for RFID tag 70 and contacts 80A-B. In some embodiments, layer 64 comprises ferrite. In some embodiments, RFID tag 70 and contacts 80A-B are connected directly to the top surface of adhesive layer 62, without the need for layer 64. In some embodiments, RFID tag 70 and contacts 80A-B are connected directly to radially outward facing surface 30 without the need for adhesive layer 62 or layer 64. In some embodiments, RFID assembly 60 further comprises layer 66. Layer 66 is operatively arranged to cover and protect RFID tag 70. As shown in FIG. 3, layer 66 completely covers RFID tag 70 and at least partially covers contacts 80A and 80B. However, it is required that at least a portion of contacts 80A and 80B are exposed, for example, exposed portions 82A and 82B, such that they are capable of engaging retaining ring 50, as will be described in greater detail below.

RFID tag 70 comprises integrated circuit (IC) or chip 72 and antenna 74. In some embodiments, RFID tag 70 comprises a passive RFID tag. In some embodiments, RFID tag 70 comprises an active RFID tag (and further comprises a power source). In some embodiments, RFID tag 70 comprises a semi-passive RFID tag. In some embodiments, RFID tag 70 is preprogrammed such that it transmits information, for example, a unique identification (UID) number, the state of RFID assembly 60 (i.e., open or closed), etc. Antenna 74 is connected at a first end to IC 72 at antenna radio-frequency (RF) input LA, and at a second end to IC 72 at antenna RF input LB, via conductors 76A and 76B, respectively. RFID tag 70 is further connected to contact 80A and contact 80B. Specifically, conductor 78A connects contact 80A with IC 72 at ground pin GND and conductor 78B connects contact 80B with IC 72 at detector pin DP.

Contact 80A is separated from contact 80B by gap 84 and gap 86 (see FIG. 5). In some embodiments, gap 84 is equal to gap 86. In some embodiments, gap 84 is less than gap 86. In some embodiments, gap 84 is greater than gap 86. Contacts 80A and 80B are arranged proximate to or abutting against shoulder 27, specifically shoulder surface 28. Contacts 80A and 80B are operatively arranged to engage with retaining ring 50. In some embodiments, contacts 80A and 80B are electrical conductors. When tube end form 20 is properly secured in fluid connector 40, retaining ring 50 expands along shoulder 27 and then snaps behind shoulder surface 28 thereby locking tube end form 20 within fluid connector 40. When retaining ring 50 snaps back behind shoulder 27 and abuts against and/or is arranged proximate to shoulder surface 28, protrusions 52A-C engage contacts 80A and 80B. For example, and as shown in FIG. 5, protrusion 52C (and protrusion 52B) is engaged with contact 80B and protrusion 52A is engaged with contact 80A. In some embodiments, retaining ring 50 comprises an electrically conductive material (e.g., metal). As such, retaining ring 50 completes the circuit between contacts 80A-B and IC 72 and causes RFID tag 70 to become enabled (i.e., RFID tag 70 is capable of being powered by an electromagnetic field generated by an external device (not shown)) or switch to a closed state (from an open state). Prior to completion of the circuit, namely, electrically connecting contact 80B directly with contact 80A, RFID tag 70 is not enabled (i.e., RFID tag 70 is not capable of being powered by an electromagnetic field generated by the external device) or in some embodiments, it indicates an open status. When the circuit is completed (i.e., retaining ring 50 directly connects contact 80A and contact 80B as shown in FIG. 5), an external device such as a RFID reader will detect that RFID tag 70 is enabled, or in a closed state, thereby indicating that RFID fluid connection 10 is properly connected. Put another way, when RFID tag 70 is enabled, the RFID reader will identify that RFID tag 70 exists and thus determine that RFID fluid connection 10 is properly connected. When the circuit is not completed (i.e., contact 80A is not directly connected to contact 80B), the RFID reader will not detect an enabled RFID tag 70 thereby indicating that RFID fluid connection 10 is not properly connected. Put in yet another way, when RFID tag 70 is disabled, the RFID reader will not identify that RFID tag 70 exists and thus determine that RFID fluid connection 10 is not properly connected.

In some embodiments, RFID tag 70 is always enabled and can be detected and read by a RFID reader regardless of whether contacts 80A and 80B are connected. In such embodiments, when contacts 80A and 80B are not directly connected, for example via retaining ring 50, RFID tag 70 is capable of transmitting, to a RFID reader, certain information. Such information may include, but is not limited to, a UID number (e.g., for the RFID tag, the tube end form, etc.), size number, model number, serial number, status of RFID tag 70 (i.e., open or closed), uniform resource locator (URL), station identification (i.e., manufacturing LOT number), date/time stamp, description, etc. Put another way, independent of whether contacts 80A and 80B are connected, RFID tag 70 will always transmit certain data (e.g., a UID number, a status, etc.) provided it is properly functioning. Thus, RFID tag 70 is preprogrammed to always transmit at least a UID number and a status (i.e., open or closed), for example, using hexadecimal data or a value. This is important because it allows the user to scan a given RFID tag to determine if it is properly functioning (i.e., if the RFID tag is properly transmitting data then it is properly functioning) as well as to determine its current state (i.e., open or closed). When contacts 80A and 80B are connected, for example, via retaining ring 50, RFID tag 70 transmits data indicating a closed status. In some embodiments, RFID tag 70 indicates a first value (e.g., a first hexadecimal value) for an open state and a second value (e.g., second hexadecimal value) for a closed state, the second value being different from the first value. It should be appreciated that RFID tag 70 may include any programming suitable for indicating that it is properly functioning and a differentiation between an open state and a closed state, and that the present disclosure should not be limited to just the use of the hexadecimal system.

Figure 6:
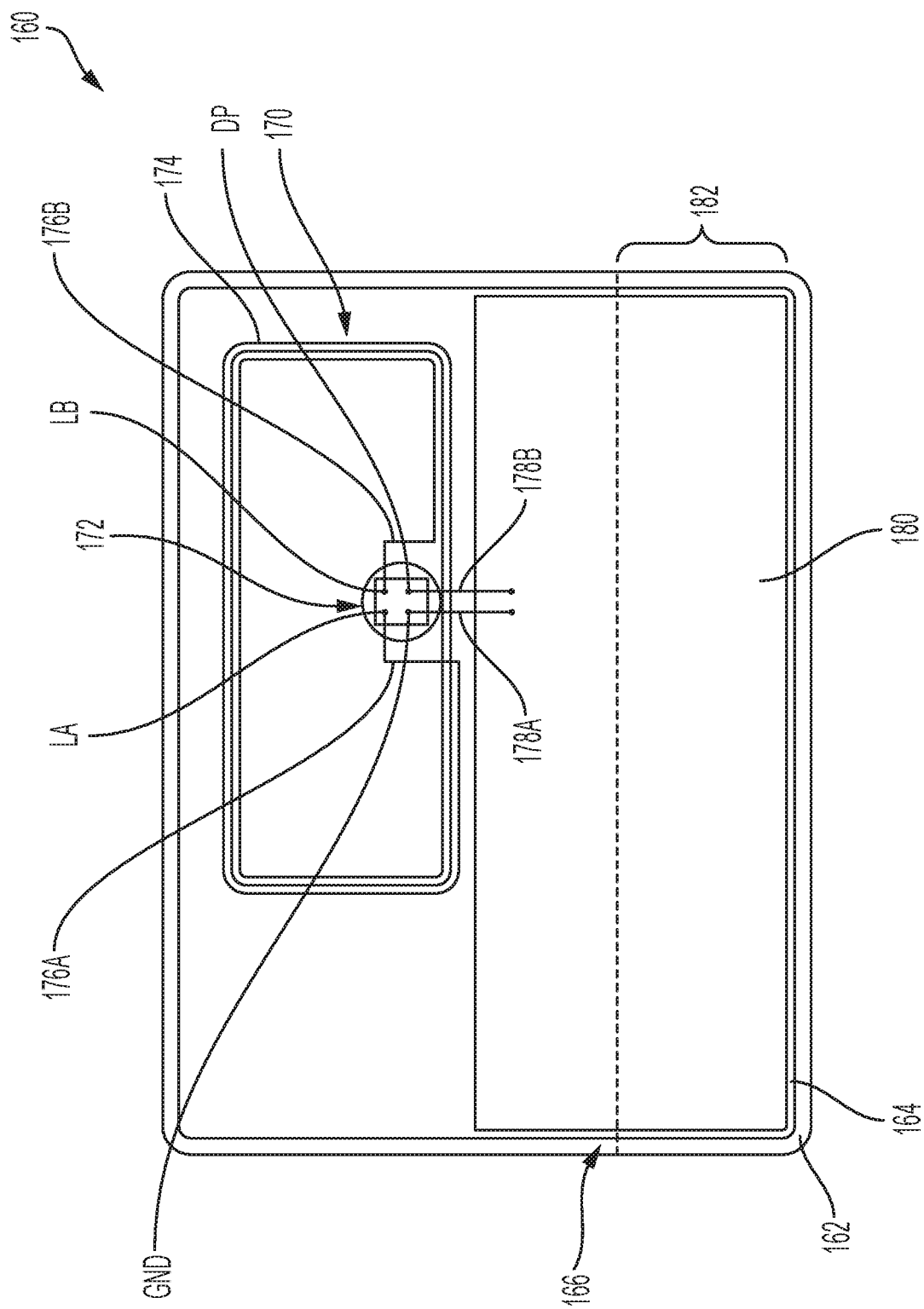
FIG. 6 is a top planar view of a RFID assembly, in accordance with some embodiments of the present disclosure.
Figure 7:
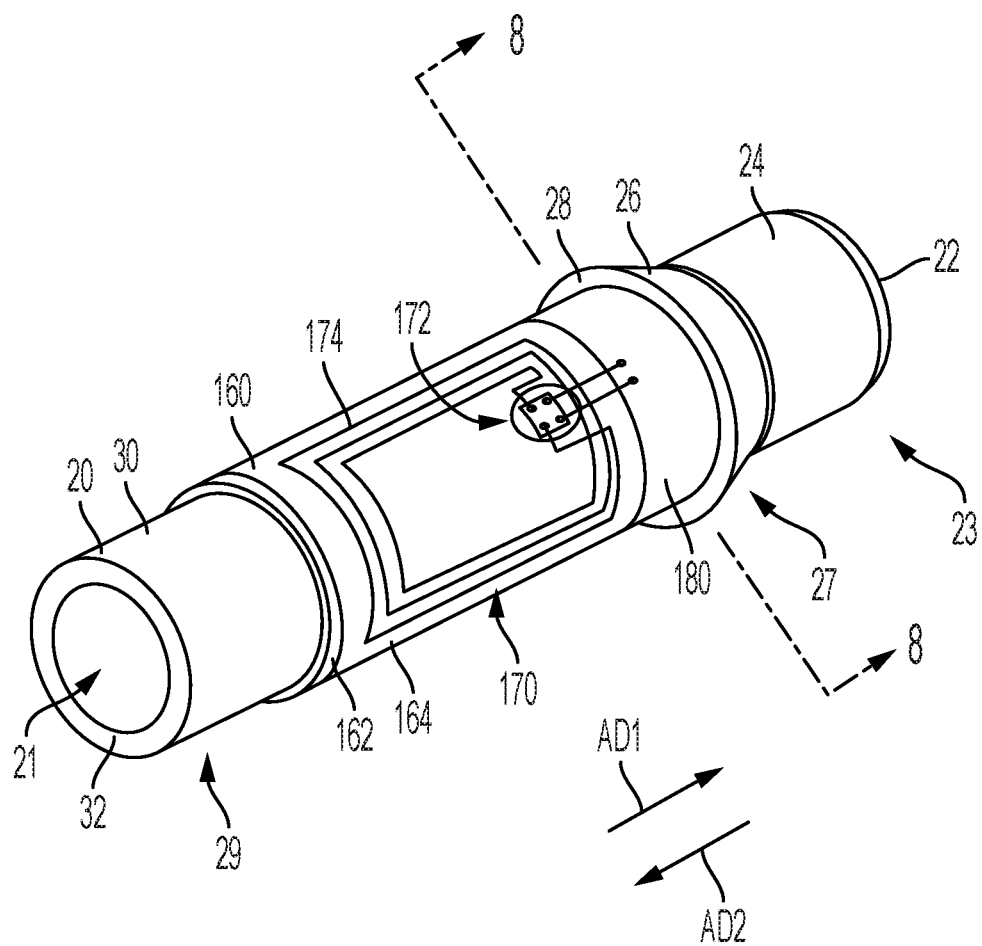
FIG. 7 is a perspective view of the RFID assembly shown in FIG. 6 arranged on a tube end form.
Figure 8:
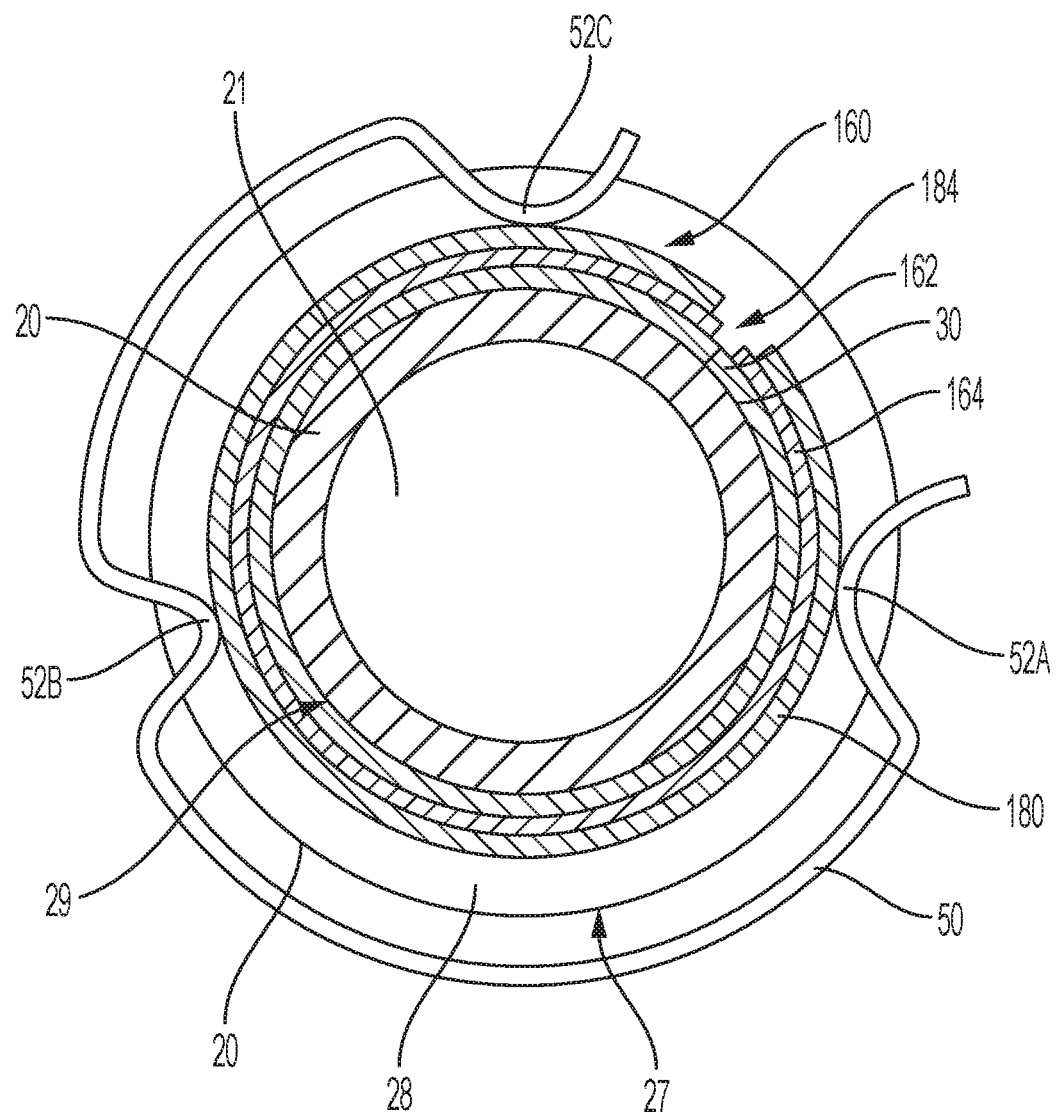
FIG. 8 is a cross-sectional view of the RFID assembly arranged on the tube end form taken generally along line 8-8 in FIG. 7.

FIG. 6 is a top planar view of RFID assembly 160, in accordance with some embodiments of the present disclosure. FIG. 7 is a perspective view of RFID assembly 160 arranged on tube end form 20. FIG. 8 is a cross-sectional view of RFID assembly 160 arranged on tube end form 20 taken generally along line 8-8 in FIG. 7. RFID assembly 160 generally comprises at least one layer (e.g., adhesive layer 162 and/or layer 164), RFID tag 170, and at least one contact (e.g., contact 180). In some embodiments, RFID assembly 160 is a RFID label that is connected to a tube or component, wherein the tube or component is arranged to be connected to another component. It should be appreciated that RFID assembly 160 may be used to ensure any type of connection, not just a connection related to the flow of fluid, for example, a constant-velocity (CV) joint, a trailer hitch connection, electrical connections, etc. The following description should be read in view of FIGS. 1-2 and 6-9B.

Adhesive layer 162 is operatively arranged to be secured to tube end form 20. In some embodiments, adhesive layer 162 secures layer 164 and/or contact 180 to tube end form 20. It should be appreciated that layer 164 need not be connected to tube end form 20 via adhesives (i.e., adhesive layer 162), but rather can be connected and/or applied using any other suitable means, for example, string, tape, hook and loop fastener, solder, welding, etc. In some embodiments, adhesive layer 162 is wrapped around section 29 of tube end form 20 and is secured to radially outward facing surface 30 proximate to shoulder 27. In some embodiments, adhesive layer 162 completely circumscribes radially outward facing surface 30 and overlaps at its ends (see FIG. 5). In some embodiments, adhesive layer 162 completely circumscribes radially outward facing surface 30 and its ends abut against each other (see FIG. 8). In some embodiments, adhesive layer 62 does not completely circumscribe radially outward facing surface 30.

RFID assembly 160 may further comprise layer 164. Layer 164 is connected to the top surface of adhesive layer 162 and is operatively arranged as a platform or base for RFID tag 170 and contact 180. In some embodiments, layer 164 comprises ferrite. In some embodiments, RFID tag 170 and contact 180 are connected directly to the top surface of adhesive layer 162, without the need for layer 164. In some embodiments, RFID tag 170 and contact 180 are connected directly to radially outward facing surface 30 without the need for adhesive layer 162 or layer 164. In some embodiments, RFID assembly 160 further comprises layer 166. Layer 166 is operatively arranged to cover and protect RFID tag 170. As shown in FIG. 6, layer 166 completely covers RFID tag 170 and at least partially covers contact 180. However, it is required that at least a portion of contact 180 is exposed, for example exposed portion 182, such that it is capable of engaging retaining ring 50, as will be described in greater detail below.

RFID tag 170 comprises integrated circuit (IC) or chip 172 and antenna 174. In some embodiments, RFID tag 170 comprises a passive RFID tag. In some embodiments, RFID tag 170 comprises an active RFID tag (and further comprises a power source). In some embodiments, RFID tag 170 comprises a semi-passive RFID tag. In some embodiments, RFID tag 170 is preprogrammed such that it transmits information, for example, a UID number, the state of RFID assembly 160 (i.e., open or closed), etc. Antenna 174 is connected at a first end to IC 172 at antenna radio-frequency (RF) input LA, and at a second end to IC 172 at antenna RF input LB, via conductors 176A and 176B, respectively. RFID tag 170 is further connected to contact 180. Specifically, conductor 178A connects contact 80 with IC 172 at ground pin GND and conductor 178B connects contact 80 with IC 172 at detector pin DP.

Contact 180 circumscribes radially outward facing surface 30. In some embodiments, and as shown in FIG. 8, the ends of contact 180 may be separated by gap 184. In some embodiments, the ends of contact 180 abut against each other. In some embodiments, the ends of contact 180 overlap each other. Contact 180 is arranged proximate to or abutting against shoulder 27, specifically shoulder surface 28. Contact 180 is operatively arranged to engage with retaining ring 50. In some embodiments, contact 180 is a pressure sensitive contact. When tube end form 20 is properly secured in fluid connector 40, retaining ring 50 expands along shoulder 27 and then snaps behind shoulder surface 28 thereby locking tube end form 20 within fluid connector 20. When retaining ring 50 snaps back behind shoulder 27 and abuts against shoulder surface 28, protrusions 52A-C engage contact 180 and apply a pressure thereto. For example, and as shown in FIG. 8, protrusions 52A-C are engaged with contact 180. In some embodiments, retaining ring 50 comprises metal. In some embodiments, retaining ring 50 comprises a non-metallic material such as a polymer or an elastomer. It should be appreciated that retaining ring 50 may comprise any material suitable to snap over shoulder 27 and apply pressure to contact 180. Once a sufficient pressure is applied to contact 180, the circuit is completed between conductors 178A and 178B and IC 172 and causes RFID tag 170 to become enabled (i.e., RFID tag 170 is capable of being powered by an electromagnetic field generated by an external device (not shown)) or indicate a closed state. Prior to completion of the circuit, namely, electrically connecting the ends of conductors 178A and 178B, RFID tag 170 is not enabled (i.e., RFID tag 170 is not capable of being powered by an electromagnetic field generated by the external device) or indicates an open state. When the circuit is completed (i.e., retaining ring 50 applies a sufficient pressure to contact 180 thereby electrically connecting conductor 178A directly with conductor 178B), an external device such as a RFID reader will detect that RFID tag 170 is enabled or in a closed state thereby indicating that RFID fluid connection 10 is properly connected. Put another way, when RFID tag 170 is enabled, the RFID reader will identify that RFID tag 170 exists and thus determine that RFID fluid connection 10 is properly connected. When the circuit is not completed (i.e., the ends of conductors 178A is not directly connected to contact 178B), the RFID reader will not detect an enabled RFID tag 170 thereby indicating that RFID fluid connection 10 is not properly connected. Put in yet another way, when RFID tag 170 is disabled, the RFID reader will not identify that RFID tag 170 exists and thus determine that RFID fluid connection 10 is not properly connected.

In some embodiments, RFID tag 170 is always enabled and can be detected and read by a RFID reader regardless of whether conductive layers 190 and 194 are in direct contact. In such embodiments, and as previously discussed, when conductive layers 190 and 194 are not directly connected, for example from the force of retaining ring 50, RFID tag 170 is capable of transmitting, to a RFID reader, certain information. Such information may include, but is not limited to, a UID number, size number, model number, serial number, status of RFID tag 170 (i.e., open or closed), URL, station identification, date/time stamp, description, etc. Put another way, independent of whether conductive layers 190 and 194 are connected, RFID tag 170 will always transmit data (e.g., a UID number, a status, etc.) provided it is properly functioning. Thus, RFID tag 170 is preprogrammed to always transmit at least a UID number and a status (i.e., open or closed), for example, using hexadecimal data or a value. This is important because it allows the user to scan a given RFID tag to determine if it is properly functioning (i.e., if the RFID tag is properly transmitting data then it is properly functioning) as well as to determine its current state (i.e., open or closed). When conductive layers 190 and 194 are connected, for example, by applying a suitable force F to layer 194 via retaining ring 50, RFID tag 170 transmits data indicating a closed status. In some embodiments, RFID tag 170 indicates a first value (e.g., a first hexadecimal value) for an open state and a second value (e.g., a second hexadecimal value) for a closed state, the second value being different from the first value. It should be appreciated that RFID tag 170 may include any programming suitable for indicating that it is properly functioning and a differentiation between an open state and a closed state, and that the present disclosure should not be limited to just the use of the hexadecimal system.

Figure 9A:
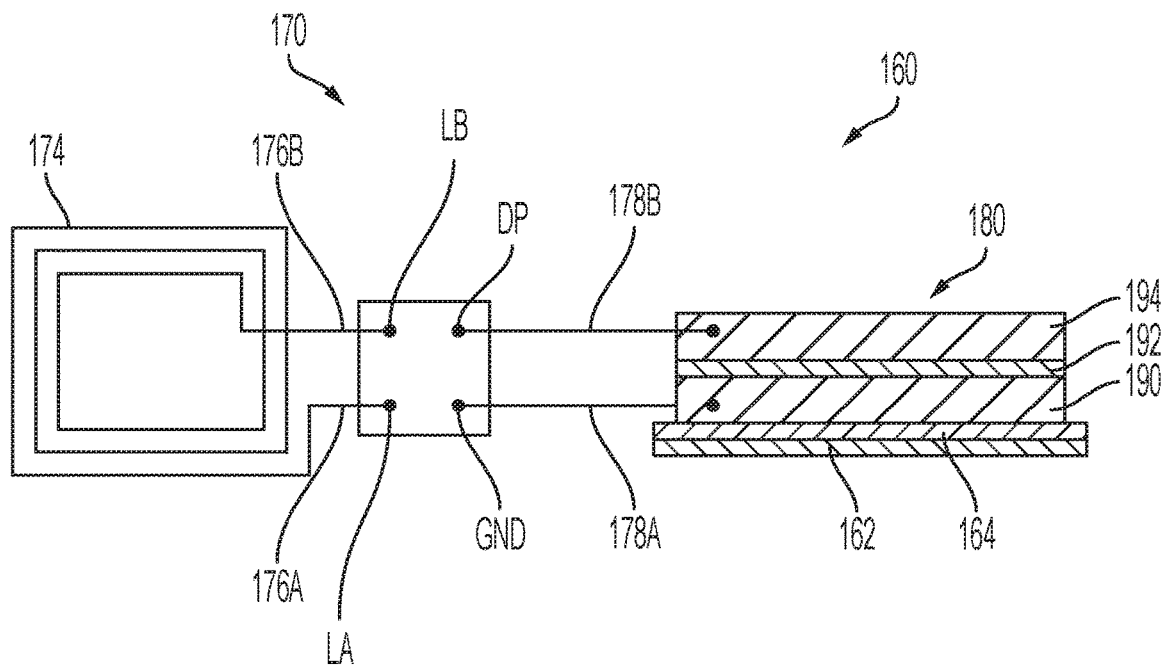
FIG. 9A is a partial cross-sectional schematic view of a RFID assembly in an open state, in accordance with some embodiments of the present disclosure.

FIG. 9A is a partial cross-sectional schematic view of RFID assembly 160 in an open (or disabled) state, in accordance with some embodiments of the present disclosure. It should be appreciated that this is only one embodiment of a pressure sensitive contact, and that various other pressure sensitive contacts that are known in the art or developed in the future may be used. Contact 180 comprises conductive layer 190, insulating layer 192, and conductive layer 194. Conductive layer 190 is arranged on the top surface of 164. In some embodiments, conductive layer 190 is arranged on the top surface of adhesive layer 162 (when layer 164 is not included). In some embodiments, conductive layer 190 is arranged on radially outward facing surface 30 of tube end form 20 (when layers 162 and 164 are not included). Insulating layer 192 is arranged on top of layer 190. Conductive layer 194 is arranged on top of insulating layer 192. Insulating layer 192 is operatively arranged to separate conductive layers 190 and 194 until a sufficient force F is applied to conductive layer 194, as will be described in greater detail below. Conductor 178A connects ground pin GND with conductive layer 190 and conductor 178B connects detection pin DP with conductive layer 194. In some embodiments, conductor 178A connects ground pin GND with conductive layer 194 and conductor 178B connects detection pin DP with conductive layer 190. As shown in FIG. 9A, conductors 178A and 178B remain unconnected and thus RFID tag 170 will indicate an open state or remains disabled (i.e., a RFID reader would not detect that RFID tag 170 exists). As such, in either case, the RFID reader will indicate that RFID fluid connection 10 is not properly secured.

Figure 9B:
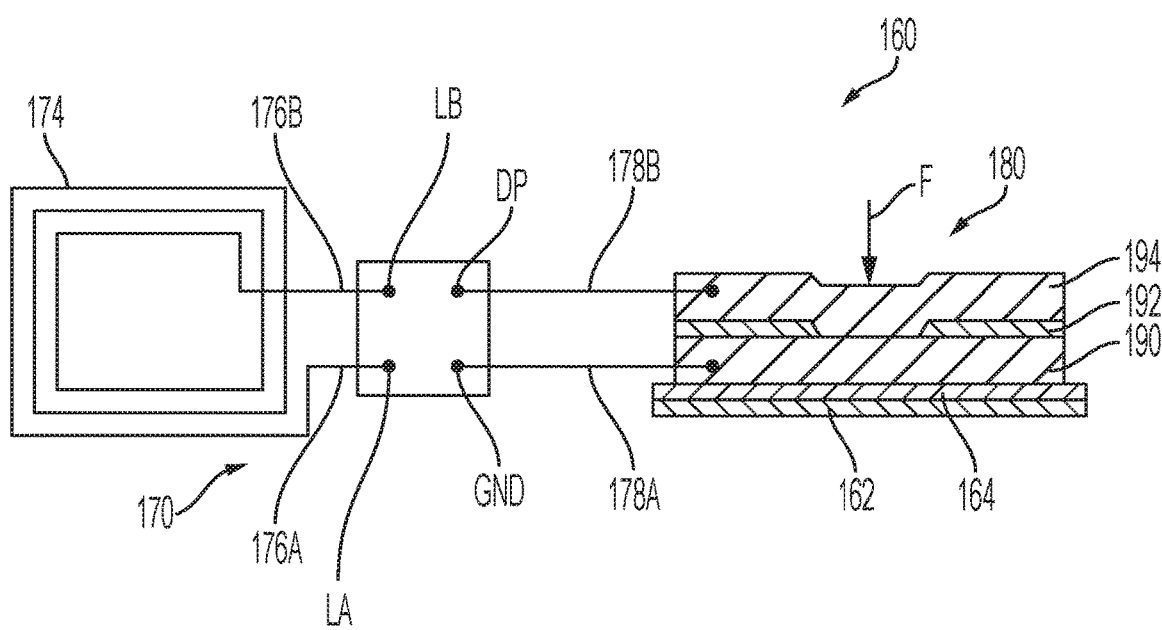
FIG. 9B is a partial cross-sectional schematic view of the RFID assembly shown in FIG. 9A, in a closed state.

FIG. 9B is a partial cross-sectional schematic view of RFID assembly 160 shown in FIG. 9A, in an closed (or enabled) state. When a sufficient force F is applied to conductive layer 194, for example via retaining ring 50, conductive layer 194 is displaced through insulating layer 192 and contacts conductive layer 190. When conductive layer 194 contacts conductive layer 190, conductors 178A and 178B are electrically connected completing the circuit and RFID tag 170 indicates a closed state or is enabled (i.e., RFID tag 170 is capable of being powered by an electromagnetic field generated by the RFID reader). As such, in either case, the RFID reader will indicate that RFID fluid connection 10 is properly secured.

Figure 10:
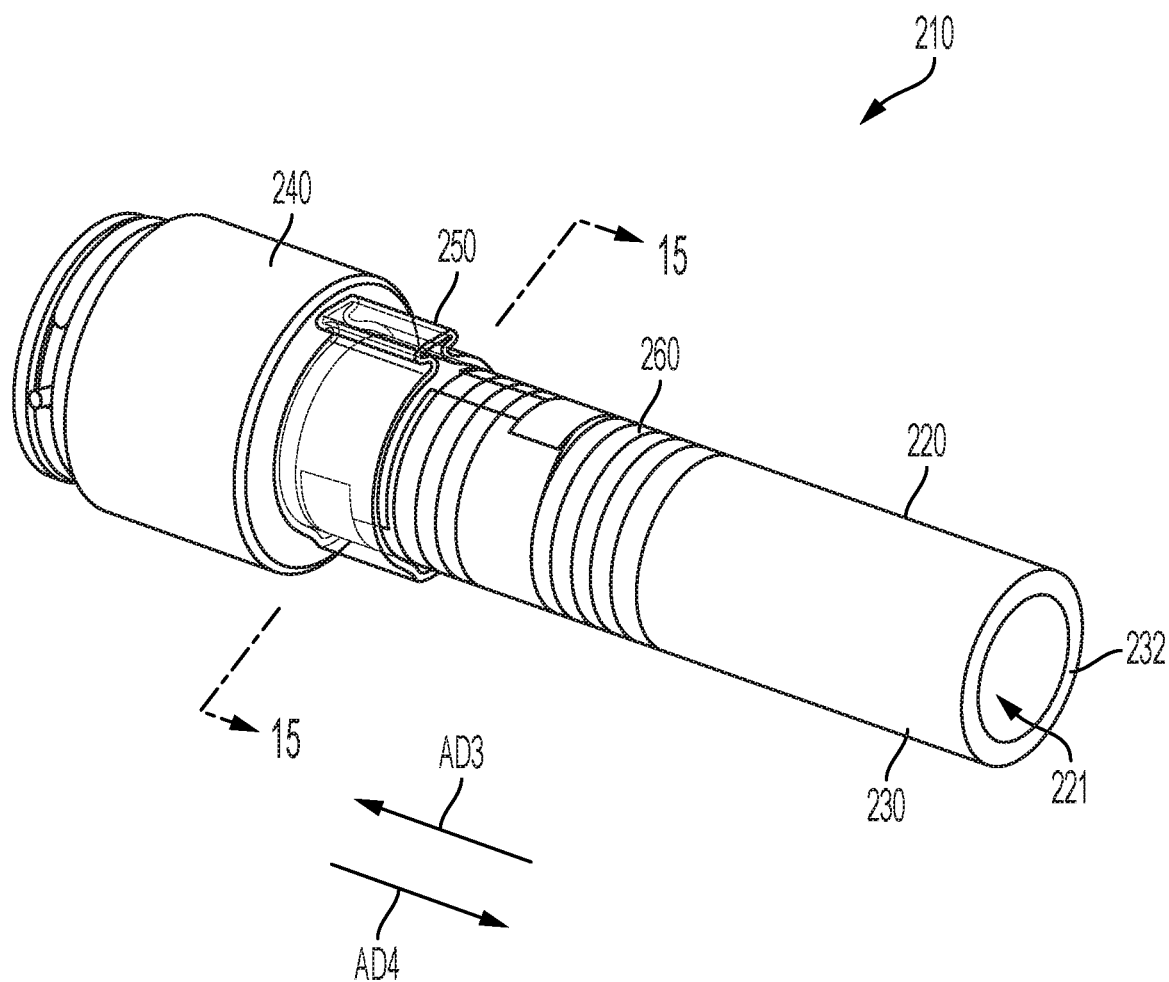
FIG. 10 is a perspective view of a RFID fluid connection, in a closed state.
Figure 11:
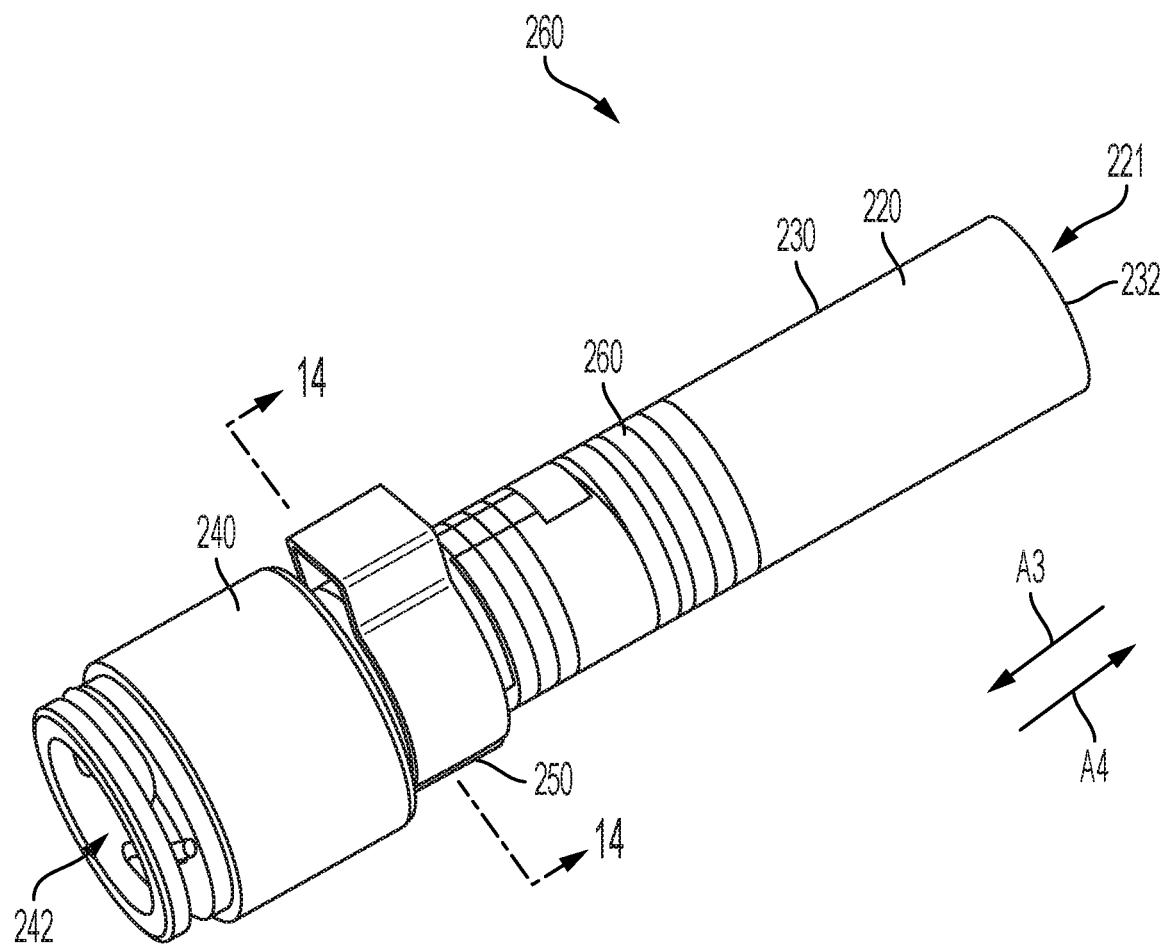
FIG. 11 is a perspective view of the RFID fluid connection shown in FIG. 10, in an open state.
Figure 12:
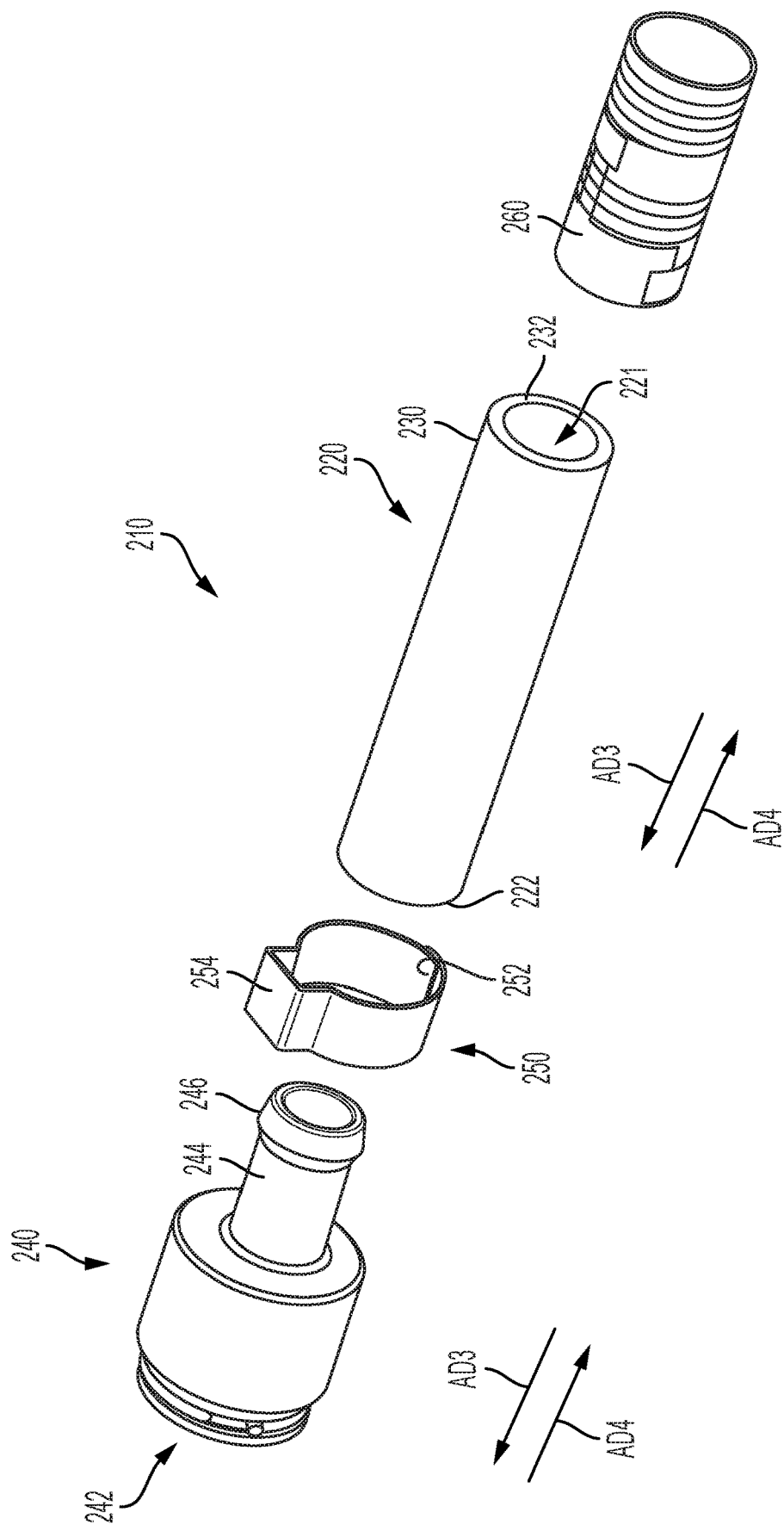
FIG. 12 is an exploded perspective view of the RFID fluid connection shown in FIG. 10.

FIG. 10 is a perspective view of RFID fluid connection 210 in a closed (i.e., secured) state. FIG. 11 is a perspective view of RFID fluid connection 210 in an open (i.e., unsecured) state. FIG. 12 is an exploded perspective view of RFID fluid connection 210. RFID fluid connection 210 generally comprises tube or hose 220, fluid connector 240, retaining ring or clamp 250, and RFID assembly 260. The following description should be read in view of FIGS. 10-12.

Tube 220 comprises end 222, end 232, radially outward facing surface 230, and through-bore 221. Through-bore 221 extends through tube 220 from end 222 to end 232. Radially outward facing surface 230 includes a substantially constant diameter. In some embodiments, radially outward facing surface 230 varies in diameter. In some embodiments, tube 220 further comprises a shoulder or a bead connected to radially outward facing surface 230. Tube 220 is arranged to engage fluid connector 240. Specifically, tube 220 is slid over barb 246 and radially outward facing surface 244 in axial direction AD3. It should be appreciated that in some embodiments, fluid connector 240 does not comprise barb 246. Once tube 220 is properly engaged with fluid connector 240, retaining ring 250 is slid over tube 220 in axial direction AD3, as shown in FIG. 11. Once properly positioned with the designated clamp location of tube 220, retaining ring 250 is crimped to secure tube 220 to fluid connector 240, as will be described in greater detail below. In some embodiments, tube 220 comprises rubber or another elastic or flexible material suitable to be securable to a fluid connector via a retainer ring or clamp. The present disclosure should not be limited to the use of only the tube shown in the figures, but rather any tube suitable for fluidly connecting to a fluid connector via a retaining ring or clamp. RFID assembly 260 verifies that retaining ring 250 has adequately tightened around tube 220 and fluid connector 240 in order to determine that RFID fluid connection 210 is properly connected, as will be described in greater detail below.

Fluid connector 240 comprises through-bore 242, radially outward facing surface 244, and barb 246. Radially outward facing surface 244 and barb 246 are arranged to engage through-bore 221 of tube 220. Retaining ring 250 is arranged to align with radially outward facing surface 244, as shown in FIGS. 10-11. Retaining ring 250 comprises radially inward facing surface 252 and crimp section 254. When crimp section 254 is "crimped" or squeezed, the radius of radially inward facing surface 252 decreases which allows retaining ring 250 to secure tube 220 to fluid connector 240. While the figures show a "crimp" style retaining ring or clamp, it should be appreciated that any clamp suitable for securing a tube or a hose to a fluid connector and contacting one or more contacts of RFID assembly 260 to indicate proper connection may be utilized, as will be described in greater detail below. Some examples of various retaining rings and clamps that may be used are rigid clamps, U-bolt clamps, flat cushion clamps, U-Bolt with cushion clamps, P style clamps, swivel bolt clamps, worm gear hose clamps, OETIKER® crimp, stepless ear hose clamps, OETIKER® band clamps, OETIKER® ear clamps, OETIKER® STEPLESS® Ear Clamps PEX Series (e.g., PEXGRIP® series ear clamps), OETIKER® spring hose clamps, OETIKER® snap grip clamps, etc.

Figure 13:
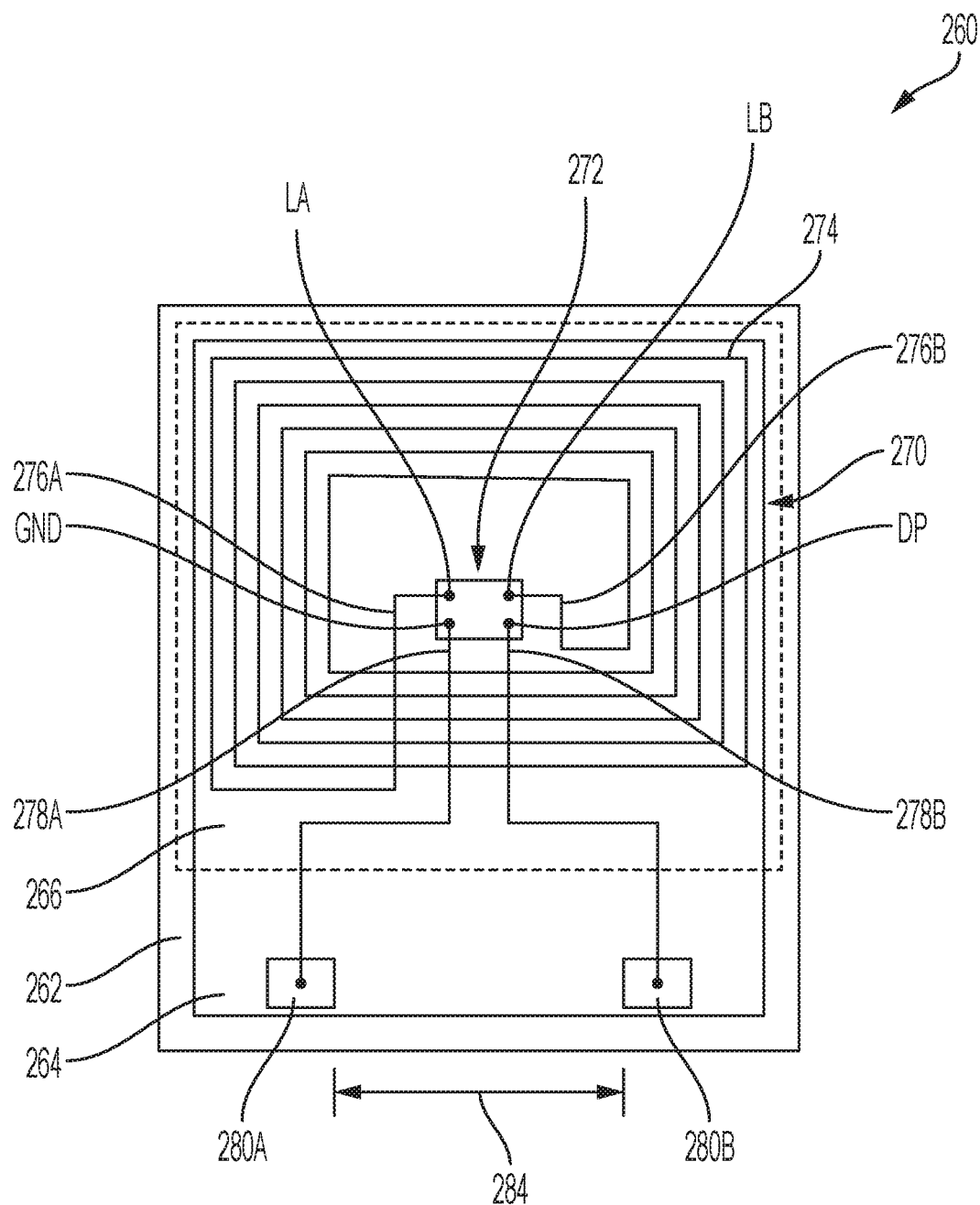
FIG. 13 is a top planar view of a RFID assembly, in accordance with some embodiments of the present disclosure.
Figure 14:
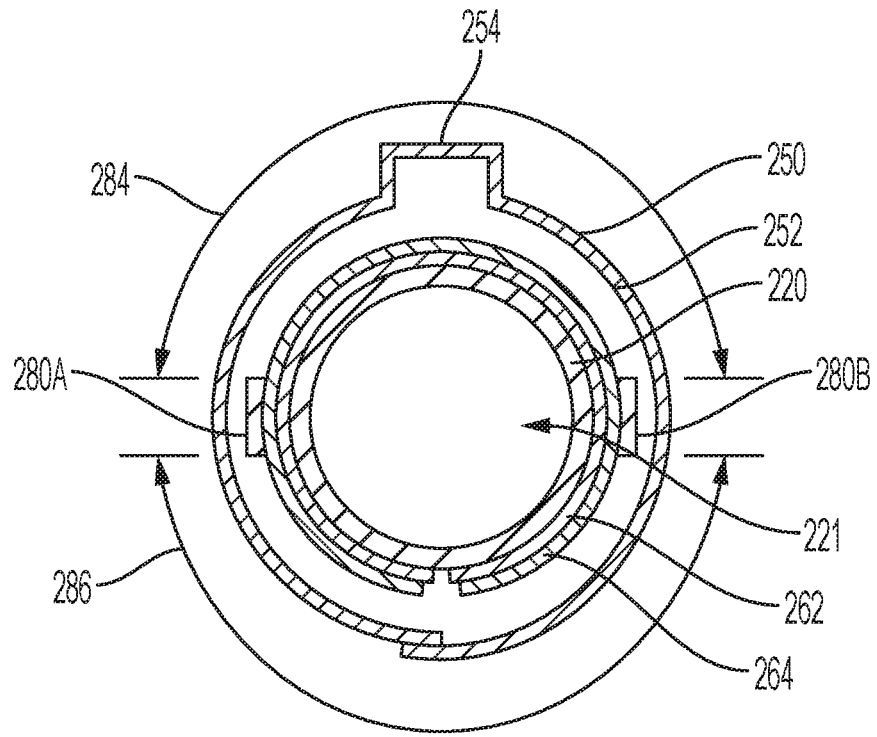
FIG. 14 is a cross-sectional view of the RFID fluid connection taken generally along line 14-14 in FIG. 11, in an open state; and, FIG. 15 is a cross-section view of the RFID fluid connection taken generally along line 15-15 in FIG. 10, in a closed state.
Figure 15:
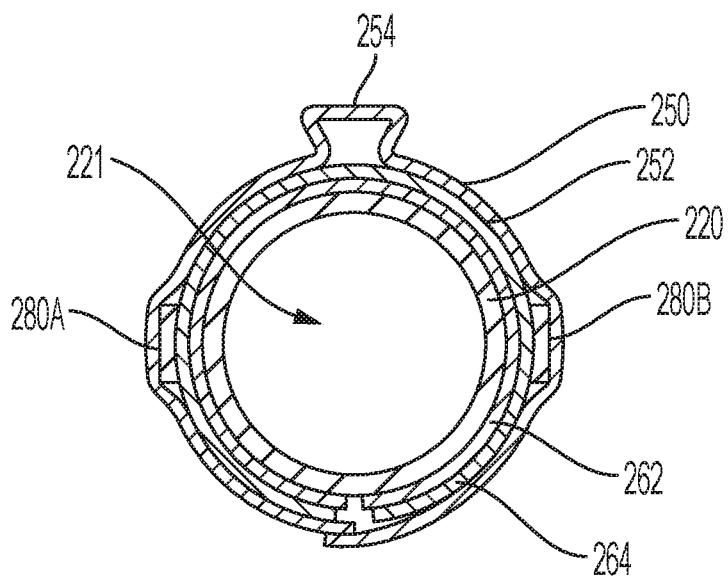

FIG. 13 is a top planar view of RFID assembly 260, in accordance with some embodiments of the present disclosure. FIG. 14 is a cross-sectional view of RFID fluid connection 210 taken generally along line 14-14 in FIG. 11, in an open state. FIG. 15 is a cross-section view of RFID fluid connection 210 taken generally along line 15-15 in FIG. 10, in a closed state. RFID assembly 260 generally comprises at least one layer (e.g., adhesive layer 262 and/or layer 264), RFID tag 270, and at least one contact (e.g., contact 280A and/or contact 280B). In some embodiments, RFID assembly 260 is a RFID label that is connected to a tube or component, wherein the tube or component is arranged to be connected to another component. It should be appreciated that RFID assembly 260 may be used to ensure any type of connection, not just a connection related to the flow of fluid, for example, a constant-velocity (CV) joint, a trailer hitch connection, electrical connections, etc. The following description should be read in view of FIGS. 10-15.

Adhesive layer 262 is operatively arranged to be secured to tube 220. In some embodiments, adhesive layer 262 secures layer 264 and/or contacts 280A and 280B to tube 220. It should be appreciated that layer 264 need not be connected to tube 220 via adhesives (i.e., adhesive layer 262), but rather can be connected and/or applied using any other suitable means, for example, string, tape, hook and loop fastener, solder, welding, etc. In some embodiments, adhesive layer 262 is wrapped around tube 220 and is secured to radially outward facing surface 230 proximate to end 222. In some embodiments, adhesive layer 262 completely circumscribes radially outward facing surface 230 and overlaps at its ends (see FIG. 5). In some embodiments, adhesive layer 262 completely circumscribes radially outward facing surface 230 and its ends abut against each other (see FIG. 8). In some embodiments, adhesive layer 262 does not completely circumscribe radially outward facing surface 230 (see FIGS. 14-15).

RFID assembly 260 may further comprise layer 264. Layer 264 is connected to the top surface of adhesive layer 262 and is operatively arranged as a platform or base for RFID tag 270 and contacts 280A-B. In some embodiments, layer 264 comprises ferrite. In some embodiments, RFID tag 270 and contacts 280A-B are connected directly to the top surface of adhesive layer 262, without the need for layer 264. In some embodiments, RFID tag 270 and contacts 280A-B are connected directly to radially outward facing surface 230 without the need for adhesive layer 262 or layer 264. In some embodiments, RFID assembly 260 further comprises layer 266. Layer 266 is operatively arranged to cover and protect RFID tag 270. As shown in FIG. 13, layer 266 completely covers RFID tag 270. In some embodiments, layer 266 at least partially covers contacts 280A and 280B. However, it is required that at least a portion of contacts 280A and 280B are exposed such that they are capable of engaging retaining ring 250, as will be described in greater detail below.

RFID tag 270 comprises integrated circuit (IC) or chip 272 and antenna 274. In some embodiments, RFID tag 270 comprises a passive RFID tag. In some embodiments, RFID tag 270 comprises an active RFID tag (and further comprises a power source). In some embodiments, RFID tag 270 comprises a semi-passive RFID tag. In some embodiments, RFID tag 270 is preprogrammed such that it transmits information, for example, a unique identification (UID) number, the state of RFID assembly 260 (i.e., open or closed), etc. Antenna 274 is connected at a first end to IC 272 at antenna radio-frequency (RF) input LA, and at a second end to IC 272 at antenna RF input LB, via conductors 276A and 276B, respectively. RFID tag 270 is further connected to contact 280A and contact 280B. Specifically, conductor 278A connects contact 280A with IC 272 at ground pin GND and conductor 278B connects contact 280B with IC 272 at detector pin DP.

Contact 280A is separated from contact 280B by gap 284 and gap 286 (see FIG. 14). In some embodiments, gap 284 is equal to gap 286. In some embodiments, gap 284 is less than gap 286. In some embodiments, gap 284 is greater than gap 286. Contacts 280A and 280B are arranged proximate to or abutting against end 222. More specifically, contacts 280A and 280B are operatively arranged to, when RFID fluid connection 210 is properly assembled, align with radially outward facing surface 244 of connector body and retaining ring 250. Contacts 280A and 280B are operatively arranged to engage with retaining ring 250. In some embodiments, contacts 280A and 280B are electrical conductors. When tube 220 is properly secured on fluid connector 240, retaining ring 250 is aligned with radially outward facing surface 244 and contacts 280A and 280B and crimped or squeezed, thereby locking tube 220 onto fluid connector 240. When retaining ring 250 is crimped, radially inward facing surface 252 engages contacts 280A and 280B. For example, and as shown in FIG. 14, in an unsecured state, radially inward facing surface 252 of retaining ring 250 is not engaged with either of contacts 280A or 280B, or alternatively, is only engaged with one of contacts 280A and 280B. In the unsecured state, radially inward facing surface 252 is not engaged with both of contacts of 280A or 280B. As shown in FIG. 15, in a properly secured state, radially inward facing surface 252 is engaged with both of contacts 280A and 280B. In some embodiments, retaining ring 250 comprises an electrically conductive material (e.g., metal). As such, retaining ring 250 completes the circuit between contacts 280A-B and IC 272 and causes RFID tag 270 to switch to a closed state (from an open state). Prior to completion of the circuit, namely, electrically connecting contact 280B directly with contact 280A, RFID tag 270 indicates an open status. When the circuit is completed (i.e., retaining ring 250 directly connects contact 280A and contact 280B as shown in FIG. 15), an external device such as a RFID reader will detect that RFID tag 270 is in a closed state, thereby indicating that RFID fluid connection 210 is properly connected.

In some embodiments, RFID tag 270 is always enabled and can be detected and read by a RFID reader regardless of whether contacts 280A and 280B are connected. In such embodiments, when contacts 280A and 280B are not directly connected, for example via retaining ring 250, RFID tag 270 is capable of transmitting, to a RFID reader, certain information. Such information may include, but is not limited to, a UID number (e.g., for the RFID tag, the tube end form, etc.), size number, model number, serial number, status of RFID tag 270 (i.e., open or closed), URL, station identification (i.e., manufacturing LOT number), date/time stamp, description, etc. Put another way, independent of whether contacts 280A and 280B are connected, RFID tag 270 will always transmit certain data (e.g., a UID number, a status, etc.) provided it is properly functioning. Thus, RFID tag 270 is preprogrammed to always transmit at least a UID number and a status (i.e., open or closed), for example, using hexadecimal data or a value. This is important because it allows the user to scan a given RFID tag to determine if it is properly functioning (i.e., if the RFID tag is properly transmitting data then it is properly functioning) as well as to determine its current state (i.e., open or closed). When contacts 280A and 280B are connected, for example, via retaining ring 250, RFID tag 270 transmits data indicating a closed status. In some embodiments, RFID tag 270 indicates a first value (e.g., a first hexadecimal value) for an open state and a second value (e.g., second hexadecimal value) for a closed state, the second value being different from the first value. It should be appreciated that RFID tag 270 may include any programming suitable for indicating that it is properly functioning and a differentiation between an open state and a closed state, and that the present disclosure should not be limited to just the use of the hexadecimal system.

It should be appreciated that the RFID tags and assemblies described herein, for example, RFID tags 70 170, and 270 and RFID assemblies 60, 160, and 260, may utilize any suitable radio frequency range. In some embodiments, RFID tags 70 170, and 270 comprise low frequency (LF) RFID tags operating in the 30 KHz to 300 KHz range, and have a read range of up to 10 cm. While LF RFID tags have a shorter read range and slower data read rate than other technologies, they perform better in the presence of metal or liquids (which can interfere with other types of RFID tag transmissions). Common standards for LF RFID include ISO 14223 and ISO/IEC 18000-2. In some embodiments, RFID tags 70 170, and 270 comprise high frequency (HF) RFID tags operating in the 3 MHz to 30 MHz range and provide reading distances of 10 cm to 1 m. In such embodiments, RFID tags 70 170, and 270 may even be near-field communication (NFC) tags since NFC technology is based on HF RFID. Common standards for HF RFID include ISO 15693, ECMA-340, ISO/IEC 18092 (for NFC), ISO/IEC 14443A and ISO/IEC 14443 (for MIFARE and other smart card solutions). In some embodiments, RFID tags 70 170, and 270 comprise ultra-high frequency (UHF) RFID operating in the 300 MHz to 2 GHz range and provide reading distances of up to 12 m. A well-known standard for UHF RFID is EPCglobal Gen2/ISO 18000-6C. Furthermore, in some embodiments, a single RFID reader is capable of detecting and receiving data from a plurality of RFID tags, not just one.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

10 RFID fluid connection
20 Tube (or tube end form or hose)
21 Through-bore
22 End
23 Section
24 Radially outward facing surface
26 Radially outward facing surface
27 Shoulder
28 Shoulder surface
29 Section
30 Radially outward facing surface
32 End
40 Fluid connector
42 Through-bore
44 Radially inward facing surface
48 Radially outward facing surface
49 Groove
50 Retaining ring (or snap ring)
52A Protrusion
52B Protrusion
52C Protrusion
60 RFID assembly (or label)
62 Adhesive layer
64 Layer
66 Layer
70 RFID tag
72 Integrated circuit (or chip)
74 Antenna
76A Conductor
76B Conductor
78A Conductor
78B Conductor
80A Contact
80B Contact
82A Exposed portion
82B Exposed portion
84 Gap
86 Gap
160 RFID assembly (or label)
162 Adhesive layer
164 Layer
166 Layer
170 RFID tag
172 Integrated circuit (or chip)
174 Antenna
176A Conductor
176B Conductor
178A Conductor
178B Conductor
180 Contact
182 Exposed portion
184 Gap
190 Layer
192 Layer
194 Layer
210 RFID fluid connection
220 Tube (or hose)
221 Through-bore
222 End
230 Radially outward facing surface
232 End
240 Fluid connector
242 Through-bore
244 Radially outward facing surface
246 Barb (or tube barb)
250 Retaining ring (or clamp)
252 Radially inward facing surface
254 Crimp section
260 RFID assembly (or label)
262 Layer
264 Layer
266 Layer
270 RFID tag
272 Integrated circuit (or chip)
274 Antenna
276A Conductor
276B Conductor
278A Conductor
278B Conductor
280A Contact
280B Contact
284 Gap
286 Gap
LA Antenna RF input
LB Antenna RF input
GND Ground pin
DP Detection pin
F Force
AD1 Axial direction
AD2 Axial direction
AD3 Axial direction
AD4 Axial direction

What is claimed is:

1. A radio-frequency identification (RFID) fluid connection, comprising:
a fluid connector;
a retaining ring operatively arranged to engage the fluid connector;
a tube operatively arranged to be connected to the fluid connector, the tube including a radially outward facing surface; and,
a RFID assembly arranged on the radially outward facing surface and including:
a RFID tag including an antenna and an integrated circuit; and,
at least one contact electrically connected to the integrated circuit;
wherein:
when the integrated circuit is open, the RFID tag indicates an improper connection of the RFID fluid connection; and,
when the integrated circuit is closed, the RFID tag indicates a proper connection of the RFID fluid connection.

2. The RFID fluid connection as recited in claim 1, wherein:
the tube further comprises a shoulder connected to the radially outward facing surface; and,
the RFID assembly is arranged proximate the shoulder.

3. The RFID fluid connection as recited in claim 1, wherein the RFID assembly is arranged on a first layer and the first layer is connected to the radially outward facing surface.

4. The RFID fluid connection as recited in claim 1, wherein the at least one contact comprises:
a first contact electrically connected to the RFID tag; and
a second contact electrically connected to the RFID tag, the second contact being separated from the first contact to form an open state of the RFID assembly.

5. The RFID fluid connection as recited in claim 4, wherein, in a closed state of the RFID assembly, the first contact is electrically connected to the second contact.

6. The RFID fluid connection as recited in claim 5, wherein the first contact is operatively arranged to be electrically connected to the second contact via a retaining ring when the tube is connected to a fluid connector.

7. The RFID fluid connection as recited in claim 4, wherein, when the tube is properly secured to the fluid connector:
the retaining ring engages the first contact and the second contact; and
the first contact is electrically connected to the second contact to form a closed state of the RFID assembly.

8. The RFID fluid connection as recited in claim 1, wherein the at least one contact comprises a pressure sensitive contact electrically connected to the RFID tag via a first conductor and a second conductor.

9. The RFID fluid connection as recited in claim 8, wherein the pressure sensitive contact comprises:
a first conductive layer electrically connected to the first conductor;
a second conductive layer electrically connected to the second conductor; and
an insulating layer separating the first and second conductive layers to form an open state of the RFID assembly.

10. The RFID fluid connection as recited in claim 9, wherein, in a closed state of the RFID assembly, the first conductive layer is electrically connected to the second conductive layer via a force applied to the first conductive layer.

11. The RFID fluid connection as recited in claim 10, wherein the force is applied to the first conductive layer via a retaining ring of a fluid connector when the tube is connected to the fluid connector.

12. The RFID fluid connection as recited in claim 1, wherein:
the antenna is electrically connected to the integrated circuit;
in an open state of the RFID tag, the antenna circuit is open; and
in a closed state of the RFID tag, the antenna circuit is closed.

13. The RFID fluid connection as recited in claim 1, wherein:
the tube further comprises a shoulder connected to the first radially outward facing surface, the shoulder arranged to interact with the retaining ring to lock the tube within the fluid connector; and
the at least one contact is operatively arranged proximate the shoulder to engage with the retaining ring.

14. The RFID fluid connection as recited in claim 1, wherein the retaining ring is a clamp.

15. The RFID fluid connection as recited in claim 1, wherein:
the fluid connector comprises a second radially outward facing surface; and
the tube and the retaining ring are operatively arranged to engage the second radially outward facing surface.

16. The RFID fluid connection as recited in claim 1, wherein:
the antenna is connected to the integrated circuit;
when the integrated circuit is open, the RFID assembly indicates a first state; and
when the integrated circuit is closed, the RFID assembly indicates a second state, different from the first state.

17. The RFID fluid connection as recited in claim 16, wherein the at least one contact comprises a first contact and a second contact.

18. The RFID fluid connection as recited in claim 17, wherein:
when the second contact is not electrically connected to the first contact, the RFID assembly indicates the first state; and
when the second contact is electrically connected to the first contact, the RFID assembly indicates the second state.

* * * * *